E. F. BRADFORD & V. R. PEIRCE.
SEWING-MACHINE TRIMMERS.

No. 177,371. Patented May 16, 1876.

Witnesses:
Henry Chadbourn.
F. Allen.

Inventors:
Erastus F. Bradford
and
Vernon R. Peirce
by Allan Andrew
their atty.

UNITED STATES PATENT OFFICE.

ERASTUS F. BRADFORD AND VERNON R. PEIRCE, OF BOSTON, MASS.

IMPROVEMENT IN SEWING-MACHINE TRIMMERS.

Specification forming part of Letters Patent No. 177,371, dated May 16, 1876; application filed January 22, 1876.

*To all whom it may concern:*

Be it known that we, ERASTUS F. BRADFORD and VERNON R. PEIRCE, both of Boston, in the county of Suffolk and State of Massachusetts, have jointly invented certain new and useful Improvements in Sewing-Machine Trimmers or Cutters; and we do hereby declare that the following is a full, clear, and exact description thereof, which will enable others skilled in the art to which it pertains to make and use the same, reference being had to the accompanying drawing, and to the letters of reference marked thereon, which form part of this specification.

Our invention relates to improvements in sewing-machine trimmers or cutters, for the purpose of cutting and trimming the edges of any desired work, parallel with the row of stitches that are sewed on the material by the sewing-machine; and our invention consists of a trimmer or cutter, projecting up through a slot-hole in the throat or needle plate from a trimmer-bar, that is located in or below the throat or needle plate, and is made to move forward and back, in a parallel line with the feed, in suitable guides. The trimmer or cutter is jointed or connected to or made in one piece with the feed-dog, by which arrangement the trimmer or cutter is moved the exact distance of the feed-dog or feed.

Figure 1:
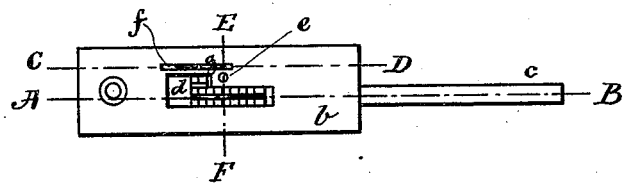
Figure 2:
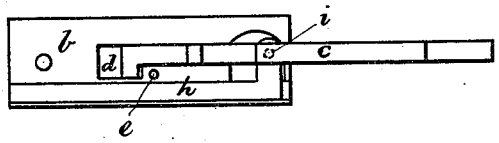
Figure 3:
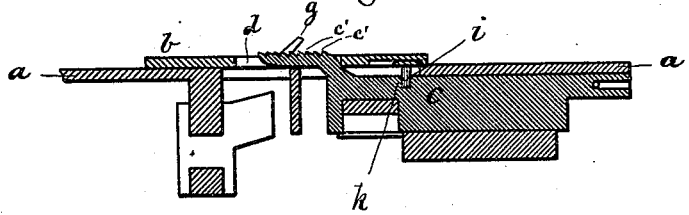
Figure 4:
Figure 5:
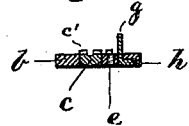

On the accompanying drawings, Figure 1 represents a plan or top view of the invention. Fig. 2 represents a bottom view of the same. Fig. 3 represents a longitudinal section on the line A B; and Fig. 4 represents a similar section on the line C D, both shown in Fig. 1. Fig. 5 represents a cross-section on the line E F, also shown in Fig. 1.

Similar letters refer to similar parts wherever they occur on the different parts of the drawings.

$a$ represents the work-plate of a sewing-machine, and $b$ represents the throat or needle plate in the ordinary way. $c$ represents the feed-dog, provided with the teeth $c'$ $c'$, that project up through the throat $d$, as usual. The feed-dog $c$ represents one of the kind in use for what is called "four-motion feed;" but our invention is equally well adapted for other kinds of reciprocating feed-motions. $e$ represents the throat for the needle.

Close to the needle-throat $e$ is made a slot-hole, $f$, through which the knife or trimmer $g$ projects, from below, from the trimmer-bar $h$, that is located in suitable guides in or below the throat or needle plate $b$, in which it is allowed to move forward and back in a straight line parallel with the feed.

The trimmer-bar $h$ is provided in one end with a pin, $i$, or equivalent device, that is inserted or connected to a hole at $k$ in the feed-dog $c$. The feed-dog $c$ is set in a reciprocating motion in its guides, by means of any of the well-known connecting mechanism, to the driving-shaft.

It will be seen from the above that the knife or trimmer $g$ is moved forward and back an equal distance with the feed of the material, and, as is usual in trimmer attachments to sewing-machines, the needle remains in the material, and the presser-foot is resting on the top of the material during the time when the trimmer performs its work—that is, when it is moved toward the operator.

When constructed as shown in the drawings, very little labor and expense are needed to provide a sewing machine with our improved trimmer attachment.

We are aware of United States Patent granted on the 27th day of October, 1874, to Lyman L. Barber for sewing-machine trimmers, in which the knife or cutter is arranged above the throat-plate; but we do not wish to claim such an arrangement as our invention, neither do we claim knives or cutters operated in a line with the needle, as shown, respectively, in English Patents No. 1,829, of 1860, and No. 816, of 1861; but What we wish to secure by Letters Patent, and claim, is—

The combination, with the throat or needle plate $b$, provided with the slot $f$ on one side of the needle-throat $e$, and the feed-dog $c$, of the movable bar $h$ and trimmer $g$, as and for the purposes set forth.

In testimony that we claim the foregoing as our own and joint invention we have affixed our signatures in presence of two witnesses.

ERASTUS F. BRADFORD.
    VERNON R. PEIRCE.

Witnesses:
 ALBAN ANDRÉN,
 HENRY CHADBOURN.